United States Patent [19]

Nunnelly

[11] Patent Number: 4,842,790
[45] Date of Patent: Jun. 27, 1989

[54] METHOD AND APPARATUS FOR PRODUCING HIGH-STRENGTH GRANNULAR PARTICULATES FROM LOW-STRENGTH PRILLS

[75] Inventor: Luther M. Nunnelly, Florence, Ala.

[73] Assignee: Tennessee Valley Authority, Muscle Shoals, Ala.

[21] Appl. No.: 176,056

[22] Filed: Mar. 31, 1988

Related U.S. Application Data

[63] Continuation-in-part of Ser. No. 158,977, Feb. 22, 1988, abandoned.

[51] Int. Cl.[4] .......................... B29B 9/10; B05D 7/00; B05C 5/00
[52] U.S. Cl. ..................................... 264/117; 71/64.02; 118/303; 264/37; 425/222; 427/212; 427/242
[58] Field of Search .............................. 264/7, 117, 37; 118/303, DIG. 2; 427/212, 214, 242; 71/64.02, 64.03, 64.04, 64.05, 64.06, 64.07; 425/222

[56] References Cited

U.S. PATENT DOCUMENTS

| | | | |
|---|---|---|---|
| 3,991,225 | 11/1976 | Blovin | 427/3 |
| 4,213,924 | 7/1980 | Shirley, Jr. | 264/7 |
| 4,353,852 | 10/1982 | Tse | 264/37 |
| 4,424,176 | 1/1984 | Shirley, Jr. et al. | 264/7 |
| 4,478,170 | 10/1984 | Bridges et al. | 118/64 |
| 4,506,453 | 3/1985 | Shirley, Jr. et al. | 34/12 |
| 4,686,115 | 8/1987 | Majer | 427/212 |
| 4,749,349 | 6/1988 | Thuring et al. | 425/222 |

Primary Examiner—Jan H. Silbaugh
Assistant Examiner—Mary Lynn Fertig
Attorney, Agent, or Firm—Robert A. Petrusek

[57] ABSTRACT

The present invention teaches a technique and provides for apparatus eminently useful for producing closely sized, high-strength granular particulates from low-strength prills such as, for example, urea and ammonium nitrate which are nitrogen fertilizers, i.e., an essential plant nutrient. Advantages and benefits derived from the practice of the present invention relate to the production of closely sized high-strength particulates useful to the chemical fertilizer industry by virtue of their having favorable properties for custom fertilizer blending, direct applications, and as a substrate for sulfur coating to produce a controlled release fertilizer. Further advantages and benefits derived from the practice of the present invention relate to the utilization of low-cost surplus prills of low stren gth as feedstock in the production of the closely sized, high-strength granu lar particulates. Accordingly, the instant granulation process requires considerably less energy input than prior art granulation processes.

6 Claims, 4 Drawing Sheets

METHOD AND APPARATUS FOR PRODUCING HIGH-STRENGTH GRANNULAR PARTICULATES FROM LOW-STRENGTH PRILLS

The invention herein described may be manufactured and used by or for the Government for governmental purposes without payment to me of any royalty therefor.

This application is a continuation-in-part of application Ser. No. 158,977, filed Feb. 22, 1988, now abandoned, for HIGH-STRENGTH GRANULAR PARTICULATES FROM LOW-STRENGTH PRILLS.

INTRODUCTION

The importance of fertilizer products containing relatively high levels of nitrogen in closely sized granular form that exhibit properties of hardness (crushing strength) and low friability (wear resistance) sufficient to prevent fracturing and dust formation thereof during bulk blending, storage, handling, and/or subsequent application in the field has long been recognized as highly desirable and appreciated by both agronomists and process engineers practicing in the chemical fertilizer industry. Closed sized granular-form fertilizers are desirable and necessary to prevent segregation of granules by size when such fertilizers are subsequently incorporated with other materials in the production of custom bulk blends. The importance of size matching and uniformity of particles in bulk blends is discussed more thoroughly in TVA publication Z-49 reprinted from the proceedings of TVA Bulk-Blending Conference, Aug. 1-2, 1973, "Quality Control in a Bulk-Blending Plant."

Presently, urea is the leading solid-form nitrogen source for agricultural uses in the United States as reported by the USDA for 1980 (Consumption of Commercial Fertilizers, 1955–1980 fiscal years: Annual Reports: Economics, Statistics, and Cooperative Service: Crop Reporting Board, U.S. Department of Agriculture, Washington, D.C.). There are several characteristics of urea that are considered favorable and that have caused the chemical industry to increase production of urea and decrease output of ammonium nitrate, which ammonium nitrate is the second leading source of solid-form agricultural nitrogen. For instance, urea has a higher plant nutrient analysis than does ammonium nitrate (46 percent versus 33.5 percent nitrogen, respectively). Further, urea is classified as a nonhazardous material, whereas ammonium nitrate in combination with carbonaceous materials in certain proportions may be rendered an explosive compound and thereby suffers severe restrictions governing the storage, shipping, and handling thereof. In addition, there are many end product uses of urea other than for fertilizer use, such as for example, in the production of certain plastics, glues/cements for production of plywood and other building materials, and as a livestock feed supplement, which end products allow the chemical industry additional markets and year-round production scheduling instead of limiting the industry to seasonal production of nitrogen for the commercial fertilizer market as is the case in the production of ammonium nitrate. A further point in favor of the production of urea is that urea may be produced by any number of several known commercial processes, some of which processes are described in Kirk-Othmer, Encyclopedia of Chemical Technology, 3rd Edition, Volume 23 (1983) pages 551–562. As may be seen, in several such applications, natural gas is the principal raw material in the production of ammonia whereby carbon dioxide is produced from the ammonia production process as a by-product. Urea is produced in such applications by the basic reaction of ammonia and carbon dioxide at elevated temperatures and pressures in the form of aqueous solutions of urea normally in the concentration range of 70 to 80 weight percent. The urea solutions are subsequently concentrated and further processed in ways to produce solid-form particulates such as prills and/or granules by several known commercial finishing applications. Also see Kirk-Othmer, 3rd Edition, Volume 23 (1983) pages 562 and 564–572. Even with all of the advantages enumerated supra as they relate to the production and/or use of urea, it must be noted that the resulting produced urea particulates exhibit certain undesirable characteristics that restrict their usefulness from the engineering and marketing point of view. For instance, the tendency of solid urea particles to cake in storage is a disadvantage that varies in degree of severity depending on the treatment and finishing process used to produce the solid particulates. Such caking tendencies oftentimes make it necessary to employ additional processing to maintain the urea particles in their initial free-flowing condition. Another disadvantageous characteristic of urea is the exhibited tendency of the particles to fracture easily into smaller particles and form substantial quantities of dust while the product is being handled, transported, and applied to the fields. Aside from the health and safety concern for the dust in the workplace, there is also the economical consideration of recovering and reprocessing the dust generated in the urea handling operations. The lack of particulate strength (hardness) and low friability (wear resistance) again varies in degree of severity and is dependent on the finishing process used in producing the urea particulates.

The two general methods of producing solid urea particulates are known as air prilling and granulation or accretion. Air prilling was the initial finishing process and the process used most by national and international urea producers. Prilling is favored for its simplicity, relatively low capital investment requirements and economically attractive operating and maintenance costs. The practice of the art of urea prilling utilizes a tall enclosed tower. Urea in the form of a highly concentrated solution or melt is pumped to or otherwise introduce atop the tower wherein the urea solution or melt is formed into droplets and allowed to free fall to the bottom of the tower through an upward-directed cooling airflow which action solidifies the solution or melt into solid particles or prills. Urea prills from commercial prilling processes are usually relatively small in size, less dense, and suffer from low hardness and high friability when compared to particulates produced from granulation processes. Urea prills are preferred for use as a livestock feed supplement and as raw material in several industrial processes; prills are least preferred for agronomic applications aforementioned. The second method of producing solid urea particulates is described in general terms as the art of granulation or accretion. This art provides for the initial generation of small seed particles and increases of such particles to the predetermined product size by gradual external addition; fusion and/or inclusion of thin layers (coating) of like material in the form of concentrated solutions and/or melts. The granulation processes normally utilize a rotating drum or pan which is designed to form a cascading bed or curtain of recycled undersize and seed particles onto which the urea solution or molten urea is sprayed wherein accretion takes place. Urea particulates as granules produced by any of several commercial granulation processes usually have favorable characteristics for storing, handling, incorporating into bulk blends, and direct application to the field.

Presently, oil-producing nations worldwide have begun producing prilled urea as a means of utilizing and marketing surpluses of natural gas from their oil field activities, whereas previously, the natural gas was either pumped back into the ground or burned off onsite. The added production has served to create vast surpluses of economically priced prilled urea for which the chemical industry is seeking profitable means of utilization.

BACKGROUND OF THE INVENTION

1. Field of the Invention

The present invention relates to a granulation process and provides for new and improved apparatus eminently useful for production of high-strength urea granules from low-strength urea prills. It will be appreciated by the chemical fertilizer industry and especially those skilled in the art of urea granulation that the practice of the present invention will result in the production of a predetermined and closely sized, urea-granular product of superior strength that is highly desirable and necessary for the production of nonsegregating bulk blends, sulfur-coated urea, and for direct application to the field. It will also become readily apparent to those skilled in this art that the practice of the present invention results in significant cost benefits in the commercial production of granular urea while utilizing low-cost, surplus urea prills to produce a highly marketable product. Still another benefit derived from the practice of the present invention allows the chemical fertilizer industry to increase the rate of production of granular urea to accommodate the seasonal demand for agricultural nitrogen inherent to the commercial fertilizer market.

A principal consideration relating to the practice of the present invention is the selection and use of methods and/or means wherein the modus operandi comprises the use of low-strength urea prills as substrate to produce high-strength granular urea.

2. Description of the Prior Art

There is a special need within the chemical fertilizer industry for efficient/economical, continuous processes and apparatuses capable of high-capacity production of high-quality urea fertilizer in predetermined, closely sized granular form. It will become apparent and appreciated by those versed in this art that the present invention is particularly well suited for meeting that special need and furthermore that the present invention is also readily adaptable on small scale to the requirements of specific industries such as, for example, the production of coated pharmaceuticals, candies and/or other similar applications. Therefore, the discussions and disclosures in the following sections describe the prior art and the application of the present invention to the production of fertilizer, both for the standpoint of granulation, i.e., gradual increase of the undersize nuclei to the desired product size by successive layering (accretion) and coating or incorporation of dissimilar fertilizer compounds such as, for example, incorporating primary and secondary plant nutrients within the granules or otherwise applying to the surface of substrate particulates permeable or semipermeable coatings of natural or synthetic polymeric compounds, oils, waxes, asphaltic and/or paraffin mixtures, and combination of such material for the purpose of the production of controlled release and other fertilizer products of proven desirable characteristics which can be produced, by my noncomplicated methods and equipment, at reasonable costs.

U.S. Pat. Nos. 3,117,020, Fabris et al. Jan. 7, 1964; 3,165,395, McCamy et al. Jan. 12, 1965; and 3,211,522, Shurter et al, Oct. 12, 1965, disclose various methods and means for the granulation of undersized fertilizer compound nuclei (recycled fines from screened product) by spraying a hot, concentrated aqueous solution or a nearly anhydrous melt of the compound into a rolling bed of the nuclei in an inclined, rotating pan. Although there is some coating action, most of the granulation, or increase to product size, is accomplished by agglomeration, or sticking together, of a number of the nuclei by the solidifying melt or solution. The granules are relatively rough and irregular, compared with layer granulation (see later section), and coating per se is minimal. The unit has little application as a true coating unit because of its natural classification action.

In U.S. Pat. No. 2,815,376, Knowlton et al. Dec. 3, 1957, there is disclosed a process for the granulation of fertilizer compounds by the spraying, or simple mixing, of the undersized fertilizer compound nuclei with a hot solution or melt of the compound in a paddle mixer, i.e., a blunger or pug mill. Again, particulates are formed by agglomeration of several nuclei into a single, larger particle bound together by the solidifying melt. Little coating action is achieved and the particles are rough and irregular.

It has also been shown that granulation, predominantly by a true coating or layering action, can be accomplished by spraying the hot solution or melt of a fertilizer compound into a fluidized bed comprised of undersized compound nuclei. For instance, as disclosed in U.S. Pat. No. 2,600,253, Lutz, June 10, 1952, ammonium nitrate or ammonium sulfate fertilizers are produced by reacting ammonia and nitric acid or sulfuric acid in a fluidized bed of undersized ammonium nitrate or ammonium sulfate particles. In other applications, principally in Europe, a hot melt or concentrated solution in the compound is sprayed into the fluidizing gas (hot air) at the bottom of the fluidized bed. The fluidized bed does achieve truly random motion of the substrate particles, and therefore results in a homogeneous mass with respect to particle size which is a consideration so necessary in uniformly coating particles of varying sizes. However, the fluidization process is inherently costly, it requires close control, and it does not permit visual examination of the sprays or product in the coating section.

In the fertilizer industry, granulation, i.e., increase in particle size from undersize (recycled fines) to product size by coating, and coating for the purpose of imparting special characteristics to the fertilizer substrate, such as controlled release or anticaking properties, is most widely practiced in essentially horizontally disposed rotary drums either with or without internal lifting vanes or flights. In U.S. Pat. No. 3,398,191, Thompson, et al, Aug. 20, 1968, disclose the granulation of urea or ammonium nitrate by spraying an essentially anhydrous melt (98–99.5 percent) of the coating compound from multiple spray heads spaced at intervals along the entire length of the coating section onto a rolling bed and into a showering curtain of undersized nuclei (recycled fines) maintained in motion by the rotation of a slightly inclined (from horizontal) rotating drum equipped with longitudinal lifting vanes or flights specially designed to form continuous longitudinal curtains of falling particles that move in succession across the entire cross-sectional area of the contact or coating zone of the drum in a manner familiar to those versed in the art of horizontal rotary drum coolers and dryers. Transverse retaining rings or dams at the feed end and discharge end of the coating section maintain an adequate depth of bed. Cooling air (ambient temperature) is drawn countercurrently through the showering curtains of falling particles to cool and solidify the layers of melt on the nuclei. The drum is extended beyond the contact zone to a cooling zone equipped with the lifting flights but without spray heads with which to further cool the product with such countercurrent flow of air.

Other essentially identical examples of this form of prior art featuring the falling curtain across the full cross-sectional area of the rotary drum are disclosed in U.S. Pat. Nos. 3,092,489, Smith, June 4, 1963; 3,277,789, Tytus et al, Jan. 4, 1966; and 3,232,703, Thompson et al, Feb. 1, 1966.

The falling curtains of particles across the full cross-sectional area of the drum, as described in the above prior art, approaches the degree of random motion of substrate, and therefore of homogeneity with respect to particle size, that is so important to the uniform coating of a mass of particles of different sizes, but it is now believed that the arrangement of spray heads within the shower of falling particles, and therefore in actual contact with many of the falling particles as a result of the falling curtains across the entire cross-sectional area of the drum, has certain serious disadvantages. Among the most serious of these disadvantages are (1) the lack of control of the spray distance, i.e., the distance that the individual droples of atomized liquid spray travels before impinging upon the moving substrate particles; some of the particles fall on each spray head, some immediately in front of it, some fall at the optimum distance, and some fall well beyond the optimum distance but are still contacted by the spray. This leads to agglomeration of the substrate particles when too short, or too rough--ineffective coatings, when too far; (2) the actual contact of many of the falling particles with the hot spray heads leads to melted substrate, which drips onto the substrate bed, causing serious agglomeration of some of the substrate; (3) visual monitoring of the invidual spray operation of impossible and (4) dusting is serious when the entire section of the rotating drum is filled with falling particles, dust formed by attrition, and solidified spray mist, all of which can be carried from the system by the cooling or heating air flowing through the coating unit. This dust problem substantially increases antipollution equipment requirements.

The coating procedure, as taught in U.S. Pat. No. 3,295,950 Blouin et al. Jan. 3, 1967; U.S. Pat. No. 3,342,577, Blouin et al, Sept. 19, 1967; and U.S. Pat. No. 3,903,333, Shirley et al, Sept. 2, 1975, are almost identical in nature, i.e., the directing of the atomized coating material only onto the rolling bed of substrate in a horizontal rotary drum having a relatively smooth interior with no lifting vanes or flights as is shown and provided for in U.S. Pat. No. 2,741,545, Nielsson, Apr. 10, 1956. The latter art, i.e., Shirley U.S. Pat. No. 3,903,333, discloses certain improvements in the former which, according to the example data disclosed, does result in somewhat more uniform coatings than those of the former art, i.e., Blouin U.S. Pat. No. 3,295,950.

However, both practice essentially the same approach as described above and, therefore, both suffer from the same serious disadvantage that precludes a truly homogeneous moving bed of particles of different sizes and therefrom true uniformity of the coating, namely, the segregation by particle size of particles of varying sizes that occurs in a smooth, horizontal rotary drum. This segregation or demixing is well documented in the extensive work of Campbell et al [Chemical Engineering 73(19), 179–185 (Sept. 12, 1966)]and McDonald et al [British Chemical Engineering 7(10), 749–753 (October 1962--Part I, ibid 7(11), 823–27 (November 1962)---(Part II; and ibid 7(12), 922–23 (December 1962)--Part III]. Although the degree of demixing or segregation that occurs in a smooth drum may be reduced by proper choice of operating and equipment variables such as bed depth or degree of drum loading, drum speed (expressed as percent of critical speed, the critical speed, i.e., revolutions/minute, of a smooth drum being defined as $76.5/\sqrt{D}$, where D=drum diameter in feet), and ratio of drum diameter to drum length, it cannot be eliminated. As a result, smaller particles tend to segregrate from the larger particles by going to the point of lowest particle velocity, namely, the center of the cross-sectional area of the bed and pass on through the drum without coming to the surface of the bed. This, of course, prevents these particles from being coated by the liquid spray.

The problems associated with segregation of particles by size within a horizontal rotating drum during application of coatings and/or granulation have been significantly reduced in the art disclosed in U.S. Pat. No. 3,877,415, Blouin, Apr. 15, 1975. The apparatus in this disclosure provides for a near homogeneous (with respect to particle size) dense mass of sized particles in random motion so that highly uniform coatings of the same or of different solids can be applied to each particle by conventional spray-coating with the liquefied coating material(s). The apparatus is a horizontal rotary drum containing lifting flights. A novel deflector pan is fixed in space inside the upper section of the drum which deflects particles falling from the lifting flights to the side of the drum where they form a narrow, dense falling cascade. The coating material is sprayed onto the cascading particles, preferably as they free-fall after leaving the lower edge of the pan. However, if desired, some or most of the coating material may be directed onto the top edge of the moving bed including the juncture of the cascade therewith. Also see U.S. Pat. No. 3,991,225, Blouin, Nov. 9, 1976.

Further improvements in the prior art of Blouin's disclosure supra were revealed in the procedures taught in U.S. Pat. No. 4,213,924, Shirley et al, July 22, 1980; U.S. Pat. No. 4,424,176, Shirley et al. Jan. 3, 1984; and U.S. Pat. No. 4,506,453, Shirely et al, Mar. 26, 1985. In these further improvements of Shirley et al, there is disclosed an improved process for the granulation or coating of hygroscopic or nonhygroscopic materials where melt is sprayed onto cascading granules of common or uncommon substrate in an enclosed vessel and where the heat given off by solidification of the melt is absorbed by evaporation of water. The water is atomized into the granulator as an extremely fine mist and evaporation is effected without impingement of such mist on either the granules or granulator internals. It was further disclosed by Shirley et al supra that the installation of two or more inclined deflector pans in step fashion in the rotary granulation drum allows the substrate elevated by lifting flights from the cascading bed in the drum to fall onto the pans. Material cascading from the pans form the upper and lower falling curtains of substate. Molten or highly concentrated urea solution is sprayed with a high degree of precision horizontally onto the lower falling curtain of substrate usually throughout the entire length of the lower falling curtain. Air cooled by the evaporation of water, which now and later will be referred to as evaporative cooling, is forced upon and through the uppermost falling curtain of substrate (recycle and nuclei) by several internally-mounted propeller fans to effect the high degree of cooling and removal of heat released in the rotary granulation drum by the solidification of molten or highly concentrated urea solution. For purposes of teaching, disclosing, and claiming the instant invention the full teachings and disclosures of Blouin U.S. Pat. No. 3,991,225 and 3,877,415 as well as Shirley U.S. Pat. Nos. 4,506,453 and 4,424,176 supra are herewith and hereby incorporated herein by reference thereto.

Those skilled in the art are well aware of heat transfer technology as it applies to fluid beds and spouted fluid beds such as have been disclosed in U.S. Pat. No. 4,219,589, Niks et al, Aug. 26, 1980, and in U.S. Pat. No. 4,217,127, Kono et al, Aug. 12, 1980, respectively. Fluid-bed technology is recognized to be one of the best heat transfer means between a gas and solid particles. The heat transfer rates within the bed are exceptionally high.

As disclosed in the teaching of Shirley et al supra, many of the principles of fluid bed were emulated herein in part to achieve extremely effective means of heat transfer. It is also an objective of the present invention to make use of fluid-bed principles to achieve efficient heat transfer and at the same time to eliminate the less desirable features in the art as practiced by Shirley et al. In this respect, the present invention borrows from the fluid bed the principle that gas blowing through suspended solid particles in a more or less dense phase, as in a fluid bed, is the best means of contact for heat transfer purposes and not as gas contact occurs in long rotary drums where gas flow is axial sometimes passing through, but mostly flowing parallel, to the showers of falling solid particles. More specifically, the present invention approaches the principles of fluid bed in the rotary granulation drum by design and action of the lifting vanes or flights and by means of a specially designed multipurpose assembly which comprises upper and lower deflector pans and a cooling-air distribution manifold to form the cascading recycle and nuclei into an upper and lower fixed falling curtain wherein essentially anhydrous urea solution or melt is sprayed hydraulically with great precision at low to moderate pressure at right angles to and along the full length of the lower curtain. Cooling air drawn from outside the facility by a single blower is forced upon and through the upper falling curtain through use of an air-distributing manifold located between and attached to the upper and lower inclined deflector pans and extends the full length of the falling curtain of substrate.

The embodiment of evaporative cooling in the procedures disclosed by Shirley et al supra is incorporated in 14-ton-per-hour falling-curtain urea-granulation plant located at the Tennessee Valley Authority's National Fertilizer Development Center, Muscle Shoals, Ala. Although the plant has been in operation since July 1983, the technology has not been well received by those versed in the art for, among other reasons, the equipment requires unusually high maintenance, the process is complicated and difficult to operate, and when it is operated improperly it causes caking and buildup on the shell and other internal parts of the rotary granulation drum.

Since of the objectives of the present invention is to develop a both a process and granulation apparatus which demonstrates reliability and simplicity in operation, the above-mentioned principle of evaporative cooling is not utilized therein because of its inherent disadvantages. Additionally, the degree of heat transfer and removal cited by Shirley et al for evaporative cooling is not needed in the practice of the present invention which now provides for heat transfer and removal from the rotary granulation drum by a much simpler and much more reliable method and/or means.

SUMMARY OF THE INVENTION

Prior art investigators have developed, taught, and disclosed methods and/or means which utilize in one way or another a number of approaches for producing fertilizers in granular form by the process of accretion, i.e., gradual increase of undersize and nuclei to the desired product size. More specifically, Blouin in U.S. Pat. No. 3,991,225 supra, Shirley and Shirley et al in U.S. Pat. Nos. 4,213,924, 4,424,176, and 4,506,453 supra have found that and taught the utilization and application of lifting flights and single and multiple deflector pans to the principles associated with fluid beds in the rotary granulation drum by causing the formation of falling curtains of homogeneous substrate of recycled undersize and nuclei which provide for the application of successive coatings of essentially anhydrous solution, thus accretion, coupled with the efficient cooling and heat removal from the rotary granulation drum by employing therein the technique of evaporative cooling.

Those skilled in the art will quickly realize and appreciate that the present invention combines certain favorable features of the prior art with new, novel, efficient, and simple techniques to provide a superior means of precision granulation to produce an economically attractive, high-quality, marketable granular urea. The process of the instant invention utilizes relatively low cost and loosely sized urea prills that are increased to predetermined and closely controlled product size. The poor-quality urea prills, utilized herein as feed, normally enter the process from storage, a portion of which is sized appropriately by screening to provide nuclei for granulation. Another portion of these same low-quality prills is routed to a urea melter, along with oversize and fines from the prilled urea screening system and oversize from the product screening system, to provide the essentially anhydrous urea melt or solution for the liquid phase of the instant granulation process. By improved process is equally applicable when the liquid phase is supplied from a urea-synthesis plant. Undersize recycle from the product screening system is returned to enter the rotary granulation drum along with urea-prill nuclei fed at a predetermined rate. The rotary granulation drum, with specially designed internals, causes the recycled undersize and urea-prill nuclei to form into fixed falling curtains. Essentially, anhydrous molten urea or solution is sprayed, with great precision, onto the bottom fixed falling curtain while cooling air at ambient conditions is blown onto and into the upper fixed falling curtain to provide the required cooling in the rotary granulation drum.

Granular urea containing oversize, product size, and undersize which is discharged from the rotary granulation drum is further cooled in a fluid-bed cooler to harden the granules to prevent breakage and thus, formation of unwanted dust. The cooled granules are then elevated and screened, oversize is returned to the urea melter, undersize recycled to the rotary granulation drum, and product size to storage. If necessary, the process provides for additional fluid-bed cooling of the product granules prior to their entering storage.

The gist underlying the concept comprising the principal embodiment of the present invention is that the process and apparatus utilizes low-strength, poor-quality, economically priced surplus urea prills that suffer from limited market acceptance to produce high-strength, high-quality, closely sized urea granules that enjoy greatly enhanced market acceptance. An added benefit to those that practice the art of the present invention is the realization of an energy saving ranging from about 17 to as much as about 25 percent by the fact that urea prills as nuclei, at ambient temperature rather than as a hot melt, are fed into the process and account for or make up from about 25 to about 33 percent of the resulting granular urea product thereby effecting significant cooling and heat removal from the rotary granulation drum.

OBJECTS OF THE INVENTION

In view of the above discussions of the problems besetting the state of the art relating to the production of high-strength granular particulates, it is therefore the principal object of the present invention to utilize the presently available, large surplus of poor-quality, low-strength urea prills to produce high-strength, closely sized urea granules of high quality.

Another object of the present invention was to utilize the presently available, large surplus of poor-quality, low-strength urea prills to produce high-strength, closely sized urea granules of high quality and to provide for the design of the process and apparatus used therefor and obtain in respect thereto for the uncomplicated, easily controlled, energy-efficient, high-capacity production of granular urea product.

Still another object of the present invention was to utilize the presently available, large surplus of poor-quality, low-strength urea prills to produce high-strength, closely sized urea granules of high quality and to provide for the design of the process and apparatus used therefor and obtain in respect thereto for the uncomplicated, easily controlled, energy-efficient, high-capacity production of granular urea product and to further provide that the resulting manufacturing process be flexible and capable of producing several distinct size ranges of granular urea product to accommodate the principal agriculture market, the special-purpose markets, such as for example, the lawn and garden fertilizer market and the forestry fertilizer market.

Still further and more general objects and advantages of the present invention will appear from the more detailed description set forth below, it being understood, however, that this more detailed description is given by way of illustration and explanation only and not necessarily by way of limitation since various changes therein may be made by those skilled in the art without departing from the true spirit and scope of the present invention.

BRIEF DESCRIPTION OF THE DRAWINGS

My invention, together with further objectives and advantages thereof, will be better understood from a consideration of the following description taken in connection with the accompanying drawings and examples in which.

DETAILED DESCRIPTION OF THE DRAWINGS

Figure 1:
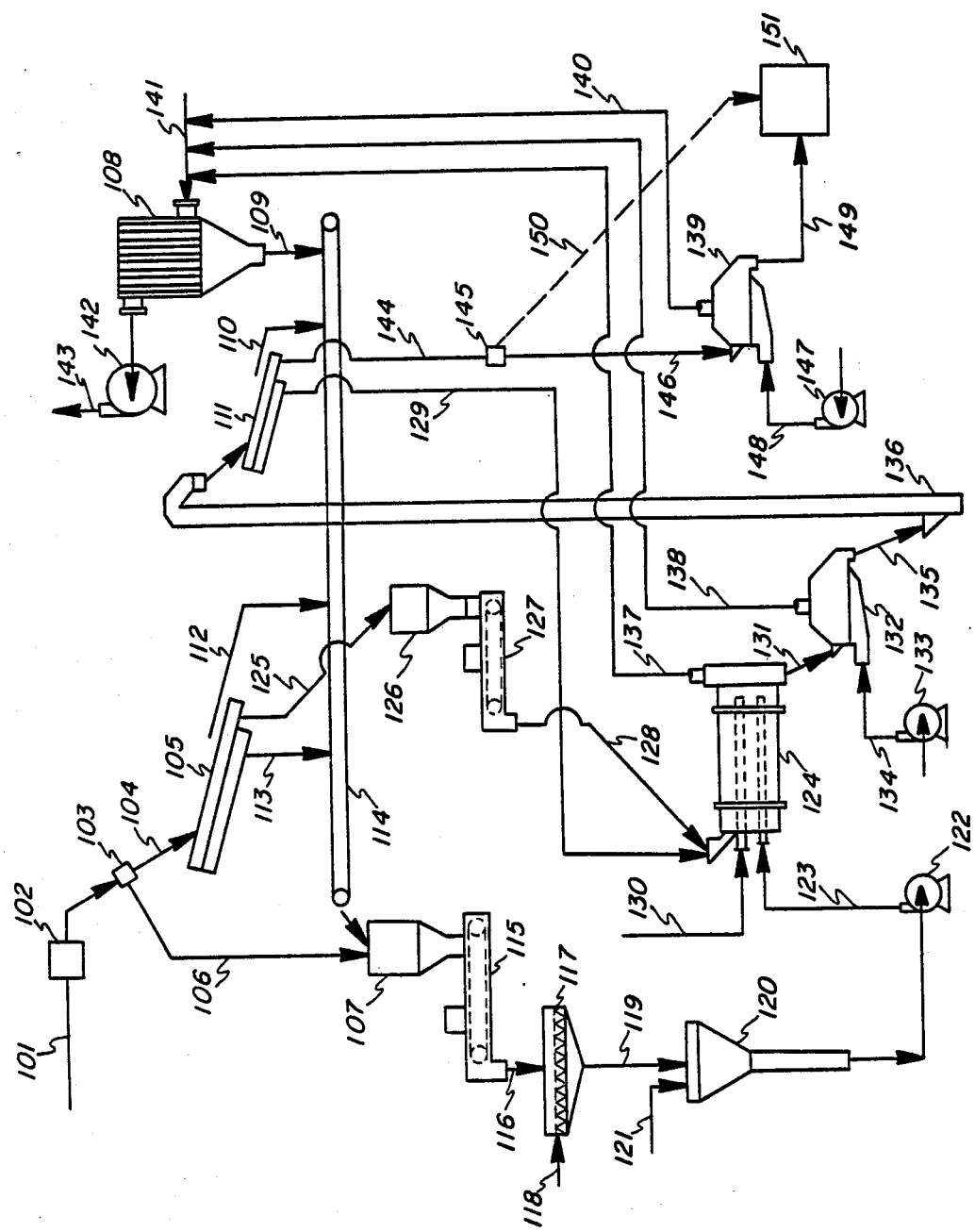
FIG. 1 represents a process flow diagram for producing granular urea from urea prills by a principal embodiment of the present invention utilizing a urea melter and a dry collector for process dust recovery.

Referring now more specifically to FIG. 1, in the practice of the process of the present invention, poor-quality, low-strength urea prills from a source not shown enter the process via line 101 and means for control of flow 102 and proceed to splitter gate 103. Splitter gate 103 routes a portion of the urea-prill feed via line 104 to sizing screen 105 and the remaining portion of the urea-prill feed via line 106 to urea-melter feed surge bin 107. In addition to unscreened urea prills via line 106, dust via line 109 from the process recovered in dry collector 108, oversize via line 110 from product screen 111, oversize via line 112 and undersize via line 113 from urea-prill sizing screen 106 also is routed by conveyor means 114 to urea-melter feed surge bin 107 and collectively metered by weigh feeder 115 and line 116 to urea melter 117 at predetermined rates which provides the essentially anhydrous molten urea to provide the liquid phase of the instant granulation process. Urea melter 117 is provided with an internal heat source which may be in the form of steam introduced via line 118. Molten urea from urea melter 117 flows via line 119 into melt pump tank 120. As an optional feature of the instant invention, any of several conditioning-hardening agents can be added from a source not shown via line 121 into the melt pump tank 120 for incorporation into the anhydrous urea melt therein prior to introduction into a later mentioned granulation drum. The melt or resulting conditioned urea melt in tank 120 is introduced via pump 122 and line 123 to rotary granulation drum 124. Appropriately sized urea prills from screen 105 are routed via line 125 to surge bin 126. From surge bin 126, the appropriately sized prills are metered by weigh feeder 127 via line 128 in the amount approximately equal to 25 to 33 percent of the total melt feed rate and, along with undersize (recycle) from product screen 111 via line 129, is introduced into granulation drum 124. The action of the specially designed lifting flights and deflector pans in rotating granulation drum 124 act to form the substrate (sized urea prills and recycled undersize) into fixed falling curtains (not shown). Urea melt introduced via line 123 is sprayed onto and along the entire length of the lower fixed falling curtain (not shown) while an adjusted flow of ambient air from a source not shown is blown via line 130 into and through the entire length of the upper fixed falling curtain (not shown) and distributed thusly by a manifold (not shown) located between the upper and lower deflector pans (not shown) to furnish necessary cooling and temperature control in rotary granulation drum 124. Granular urea discharging from granulation drum 124 via line 131 and comprising oversize, onsize, and undersize is further cooled in fluid-bed cooler 132 to harden the granules thus reducing breakage and dust formation during screening and subsequent handling. Fluid-bed cooler 132 is operatively connected to blower 133 via line 134. The resulting cooled granules from fluid-bed cooler 132 are introduced via line 135 to elevator means 136 for transfer to product screen 111 for screening. Exhaust air from granulation drum 124 via line 137, process cooler 132 and line 138, and product cooler 139 and line 140 as well as from miscellaneous dust pickup points throughout the process, generally illustrated as line 141, is passed through dry collector 108 to recover the urea dust. Dust-free air is vented to the atmosphere by means of exhauster 142 and line 143. Cooled granules from elevator means 136 is appropriately screened at 111 with the oversize routed through feeder 115 to urea melter 117 via line 110 and conveyor means 114, undersize recycled via line 129 to granulation drum 124, and product-size granules routed via line 144 to diversion gate 145. If addition cooling is needed, the product granules are routed from diversion gate 145 via line 146 to product cooler 139. Product cooler 139 is operatively connected to blower 147 via line 148. Cooled product granules from product cooler 139 are moved, via line 149 to storage generally illustrated at 151. If such additional cooling is deemed unnecessary, product granules are routed from diversion gate 145 via line 150 to storage 151.

Figure 2:
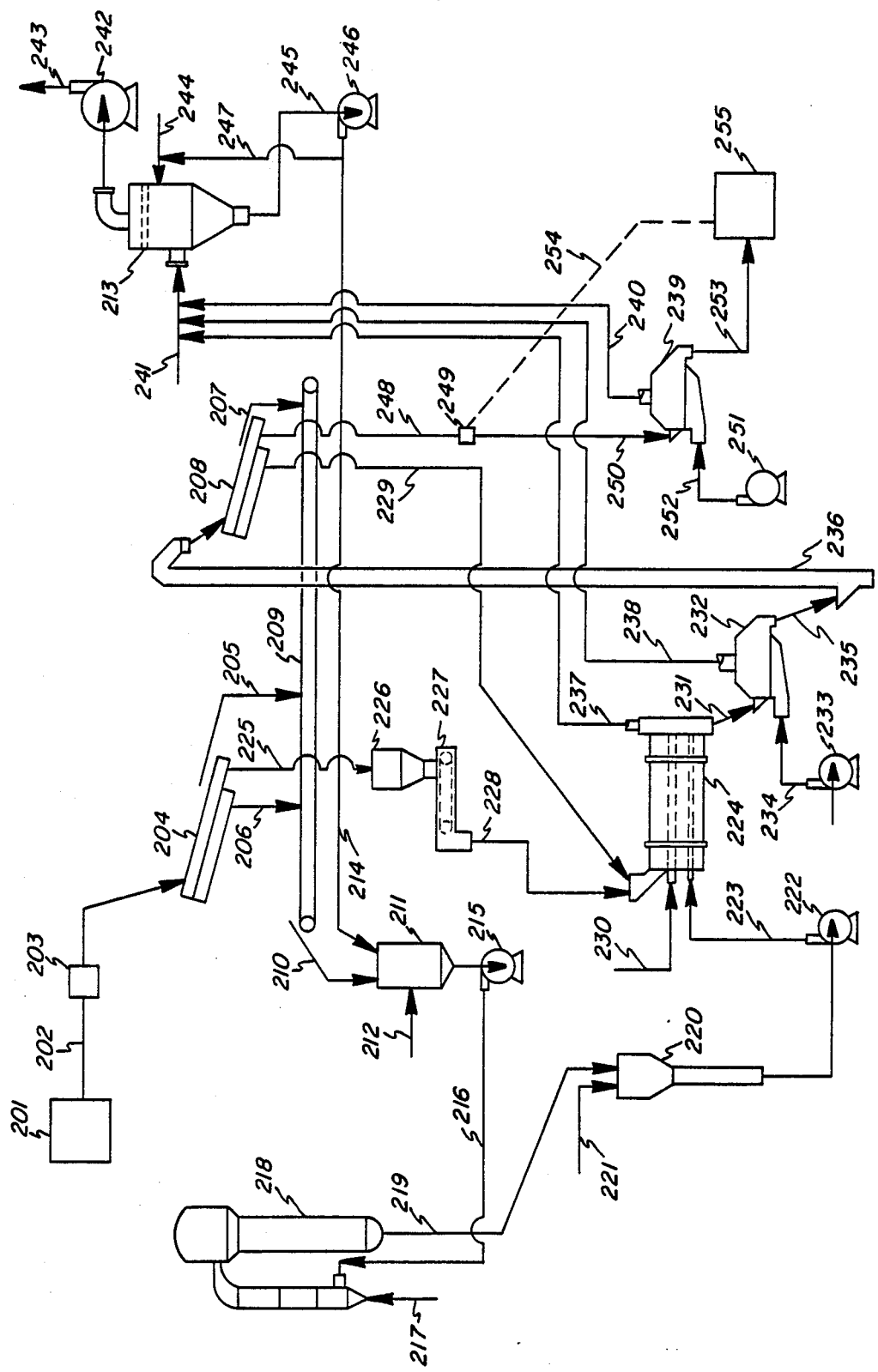
FIG. 2 illustrates a process flow diagram for producing granular urea from urea prills by an alternate embodiment of the present invention in which the liquid phase or urea used for granulation is supplied by the output of a urea synthesis plant and the dust recovery by wet scrubbers.

Referring now more specifically to FIG. 2 which illustrates an alternate embodiment of the process of the present invention, essentially anhydrous urea solution from a urea-synthesis plant (not shown) is utilized and process dust collected from the various pickup points is recovered by a later mentioned wet scrubber. Poor-quality, low-strength urea prills from a source generally illustrated at 201 enters this alterate process via line 202 and means of control of flow 203 and proceeds to sizing screen 204 where the urea feed prills are appropriately sized by properly selected screen cloths into factions of oversize, onsize, and undersize particles. Oversize prills via line 205, undersize via line 206 from sizing screen 204, in addition to oversize via line 207 from process screen 208 are transferred by conveyor means 209 and introduced via line 210 into dissolving tank 211. Dissolving tank 211 is provided with an internal heat source which may be in the form of steam introduced via line 212. Makeup solution for dissolving tank 211 is scrubber solution from web solution 213 and introduced therein via line 214. Urea solution from dissolving tank 211 via pump 215 and line 216 and urea solution via line 217 from a urea-synthesis plant (not shown) are fed to urea evaporator/concentrator means 218 at predetermined rates and at the usual concentration of 75 to 87 weight percent by appropriate metering devices (not shown). Essentially anhydrous molten urea from evaporator/concentrator means 218 and line 219 is routed into molten urea pump tank 220. As an optional feature of the instant invention, any of several conditioning-hardening agents can be added from a source not shown via line 221 into molten urea pump tank 220 for incorporation into the anhydrous molten urea prior to introduction into a later mentioned granulation drum. The molten urea or resulting conditioned molten urea in tank 220 is introduced via pump 222 and line 223 to rotary granulation drum 224. Appropriately sized urea prills from screen 204 are routed via line 225 to surge bin 226. Sized prills from bin 226 are metered by weigh feeder 227 and line 228 in the amount approximately equal to 25 to 33 percent of the total molten urea feed rate and, along with undersize (recycle) from product screen 208 via line 229, are introduced into granulation drum 224. The action of the specially designed lifting flights and deflector pans (not shown) in rotary granulation drum 224 act to form the substrate (sized urea prills and recycled undersize) into fixed falling curtains (not shown). Molten urea introduced via line 223 is sprayed onto and along the entire length of the lower falling curtain (not shown) while an adjusted flow of ambient air from a source not shown is blown via line 230 into and through the entire length of the upper fixed falling curtain (not shown) and distributed thusly by a manifold (not shown) located between the upper and lower deflector pans (not shown) to furnish necessary cooling and temperature control in rotary granulation drum 224. Granular urea discharging from granulation drum 224 via line 231 and comprising oversize, onsize, and undersize is further cooled in fluid-bed process cooler 232 to harden the granules thus reducing breakage and dust formation during screening and subsequent handling. Fluid-bed process cooler 232 is operatively connected to blower 233 via line 234. The resulting cooled granules from fluid-bed process cooler 232 are introduced via line 235 to elevator means 236 for transfer to product screen 208 for screening. Exhaust air from granulation drum 224 via line 237, process cooler 232 via line 238, product cooler 239 via line 240, as well as from miscellaneous dust pickup points throughout this alternate process, generally illustrated as line 241, is passed through wet scrubber 213 to recover urea dust. Essentially dust-free air is vented to the atmosphere by means of exhauster 242 and line 243. Steam condensate or water from a source not shown enters wet scrubber 213 via line 244 as needed. Resulting scrubber solution from wet scrubber 213 and line 245 consisting of dissolved urea dust in water is recirculated to wet scrubber 213 by pump 246 via line 247 and, as needed, scrubber solution is transferred from scrubber 213 via line 245; pump 246 and line 214 to dissolving tank 211 for makeup solution. Cooled granules from elevator means 236 is appropriately screened at 208 with oversize via line 207 routed to dissolving tank 211 via conveyor means 209 and line 210, undersize recycled via line 229 to granulation drum 224, and product-size granules routed via line 248 to diversion gate 249. If additional cooling is needed, product granules are routed from diversion gate 249 via line 250 to product cooler 239. Product cooler 239 is operatively connected to blower 251 via line 252. Adequately cooled granules from product cooler 239 are moved via line 253 to storage generally illustrated at 255. If additional cooling is deemed unnecessary, product granules are diverted from diversion gate 249 via line 254 to storage 255.

Figure 3:
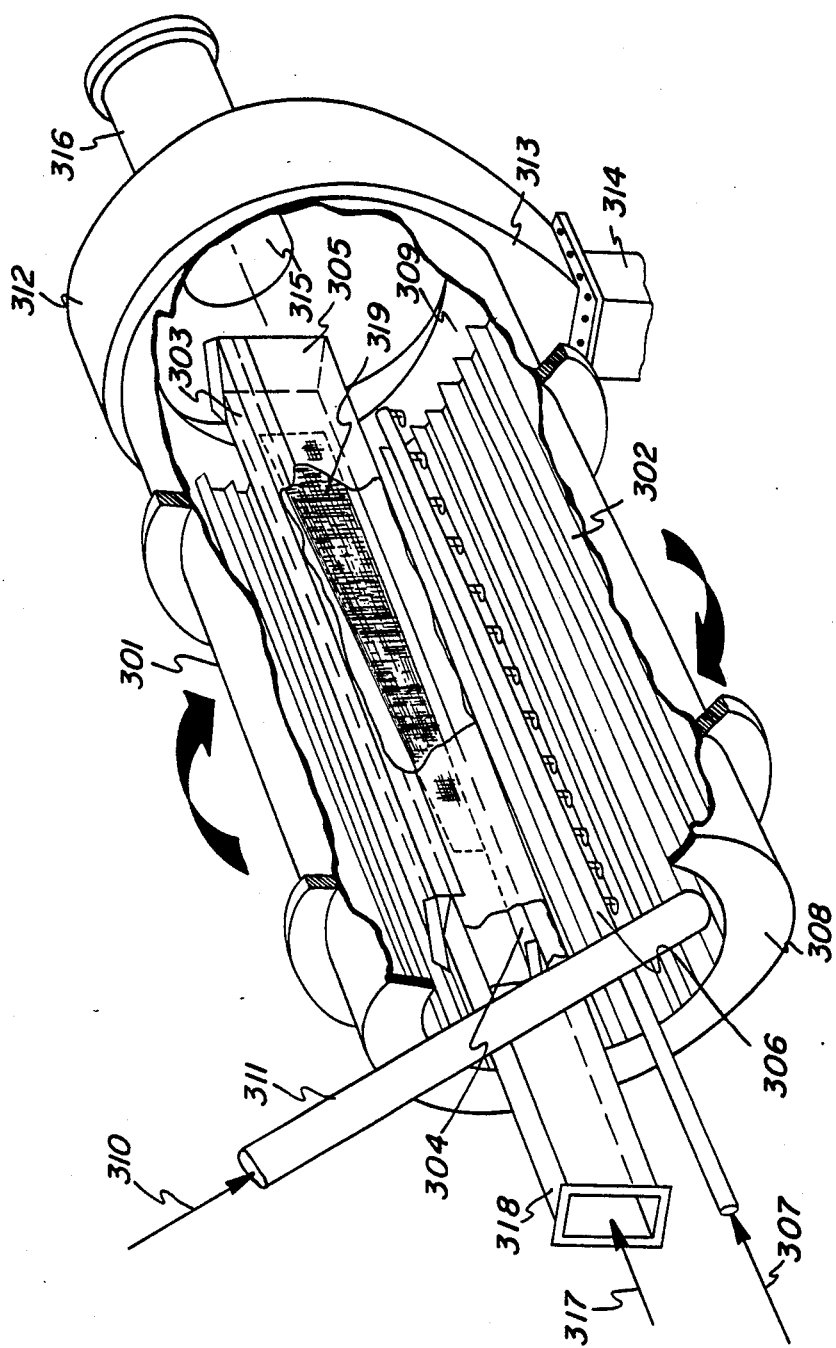
FIG. 3 is a pictorial isometric view of the rotary granulation drum utilized in the practice of the present invention and which shows the relative positios of the deflector pans, cooling-air distribution manifold, and urea melt or concentrated urea-solution spray header.

Referring now more specifically to FIG. 3 which is a pictorial isometric view of rotary granulation drum 301 utilized in the process of the present invention and which shows the relative positions of the lifting flights 302, a multipurpose assembly that includes the upper deflector pan 303, lower deflector pan 304, cooling-air distribution manifold 305, and urea-melt spray header 306 therein is illustrated and exemplary granulation drum of pilot-plant size that has a granulating capacity of 6,000 pounds per hour of product and is 7 feet in diameter and 10 feet long. Those skilled in the art of granulation will recognize and appreciate the simplicity of design and function of said vessel which provides for a granulation method, principally that of spraying essentially anhydrous molten urea via header 306 and line 307 with great precision onto the lower fixed falling curtain of undersize and urea-prill nuclei feed (not shown). It can be seen that rotary granulation drum 301 is a cylindrical vessel, the axis of which may be mounted horizontally or slightly below horizontal at the discharge end to facilitate solid particle movement through the drum. Granulation drum 301 is provided with feed-end retaining ring 308 and discharge-end retaining ring 309 or angular dams that form and retain the cascading bed of feed particles (not shown). Feed particles collectively made up from sized urea prills and undersize from sources not shown enter rotating vessel 301 via line 310 through fixed chute 311 which projects through the opening of feed-end dam 308. Granulation drum 301 is caused to rotate at the desired speed by a drive assembly (not shown) while mounted on rollers (not shown) in a manner familiar to those versed in the art of horizontal rotary kilns, dryers, and coolers.

The discharge end of rotary granulation drum 301 is equipped with closed and essentially gas-tight hood assembly 312, also familiar to those versed in the art of rotary drum coolers and dryer design. The lower section of hood 312 is provided with discharge port 313 for granular material exiting drum 301. Port 313 is funneled and/or otherwise shaped in such ways as to assist in the movement of granular material, which exits drum 301 via outlet chute 314. The top section of hood 312 is provided with gas port 315 and outlet duct 316 through which the cooling, heating, or ventilating gases are drawn from drum 301 by an exhauster or other means (not shown).

As shown in FIG. 3, multiple and evenly spaced lifting flights or vanes 302, which are longitudinal, are fixed to the internal wall of drum 301, are parallel to its axis, and extend approximately the entire length of drum 301. It can also be seen that upper deflector pan 303, lower deflector pan 304, and cooling-air distribution manifold 305 are constructed as a multipurpose assembly which is installed horizontally along the axis in the upper section of drum 301 and extends essentially throughout its length. Top deflector pan 303 and lower deflector pan 304 are installed in step fashion such that the planes they form are approximately parallel to one another. Both pans are inclined counter to the drum rotation at angles so that feed particles elevated from the cascading bed (not shown) in drum 301 by lifting flights 302 discharge onto the pans and flow from said pans to form the particles into fixed free-falling curtains (not shown).

Cooling air, via line 317, introduced in drum 301 via duct 318 at velocities ranging from approximately 1,000 to 2,000 feet per minute, from a source not shown, is distributed at velocities usually ranging from about 80 to about 160 feet per minute across the length of the upper falling curtain of feed particles (not shown) by cooling-air manifold 305 located between the upper and lower pans. The side of manifold 305 adjacent to the upper falling curtain of feed particles (not shown) is provided with screen-covered opening 319 that is approximately equal to ten times the cross-sectional area of manifold 305. Depending upon anticipated operating conditions and other considerations, the ratio in commercial plants of opening 319 to the cross-sectional area of manifold 305 may range from about 8:1 to about 15:1. The pressure drop created by cooling airflow through screen-covered opening 319 serves to distribute the said airflow as desired along the length of cooling-air distribution manifold 305 which also serves to prevent feed particles and/or dust particles from entering therein. Cooling-air distribution manifold 305, which preferably is rectangular in cross-section, is provided with air-directional vanes (not shown) on its outside wall above and below the screen-covered opening 319 and extends the entire length of said opening. Cooling-air distribution manifold 305 which is fixed and sealed to upper deflector pan 303 and lower deflector pan 304, is also provided with baffles (not shown) at each end of screen-covered opening 319 to prevent bypassing; therefore, cooling air distributed by said manifold 305 is positively forced through and beyond the upper fixed falling curtain of feed particles to provide efficient and necessary cooling therein.

Figure 4:
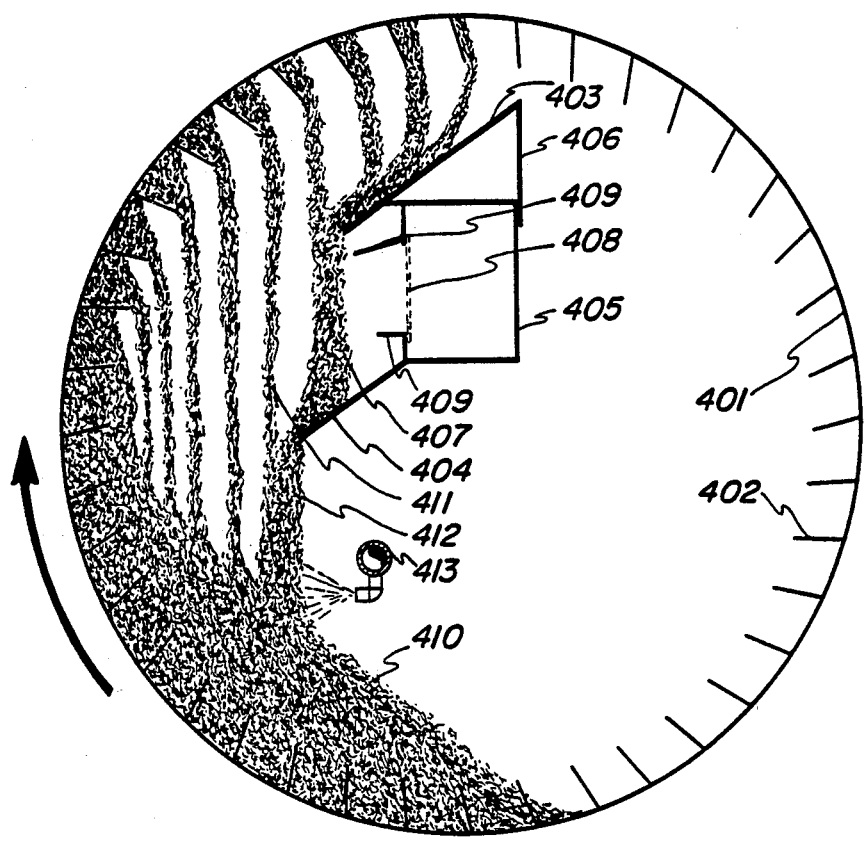
FIG. 4 is a cross-section view of the granulation drum utilized in the practice of the present invention which illustrates the action of the specially designed internal equipment components and their relative locations therein.

Referring now more specifically to FIG. 4 which is a cross-sectional view of rotary granulation drum 401 utilized in the process of the present invention and which illustrates its action therein and the relative position of specially designed internal equipment components, therein is illustrated an exemplary granulation drum for large pilot-plant application 7 feet in diameter and 10 feet in length. Granulation drum 401 is equipped with 40 evenly spaced lifting flights or vanes 402 installed at 9-degree intervals. Flights 402 are longitudinal and fixed to the internal wall of drum 401 parallel to its axis. They are flat, about 5 inches wide, 8 feet 10 inches in length, and canted about 15 degrees forward toward the rotation of drum 401 from a perpendicular with its shell.

A multipurpose assembly which includes top deflector pan 403, bottom deflector pan 404, and cooling-air distribution manifold 405 is installed in the upper section of drum 401. Said assembly is installed parallel to drum 401 axis and extends approximately the entire length of drum 401. Top deflector pan 403 is flat, 1 foot 11 inches side, 9 feet 2 inches long, and sloped at an angle of about 35 degrees from the horizontal and counter to the rotation of drum 401. Top pan 403 is attached to manifold 405 with hinges (not shown) and their connection sealed to prevent cooling air from bypassing and to allow the slope of deflector pan 403 to be adjusted without interrupting operation. Dust shield 406 is attached to the uppermost edge of deflector pan 403 and extends approximately vertically by downward and is of sufficient dimension to provide for overlapping the top of manifold 405 to prevent dust buildup in the generally triangular section shown atop manifold 405. Bottom deflector pan 404 is attached to lower edge of manifold 405 with hinges (not shown) and their connection sealed to prevent cooling air from bypassing and to allow its slope to be adjusted without interrupting operation. Bottom pan 404 which is sloped counter to the rotation of drum 401 at an angle of about 35 degrees, is flat, 1 foot 1 inch wide, and 9 feet 4 inches long. Top pan 403 and bottom pan 404 are installed in step fashion so that the planes they form are approximately parallel to one another. Cooling-air distribution manifold 405, which is located between and attached to top pan 403 and bottom pan 404, is rectangular in cross-section, 1 foot wide, 1 foot 4 inches high, and extends essentially the entire length of drum 401. The side of manifold 405 adjacent to upper fixed falling curtain of feed particles 407 is provided with screen-covered opening 408 which extends essentially the entire length of upper fixed curtain of feed particles 407. The area of said opening 408 is approximately equal to ten times the cross-sectional area of manifold 405. A pressure drop created by cooling airflow from a source not shown through screened opening 408 serves to distribute said airflow along the length of upper fixed curtain of feed particles 407 to provide necessary cooling and temperature control of the granulation process effected within drum 401. Cooling-air distribution manifold 405 is provided with air-directional vanes 409 located above and below screen-covered opening 408. Air-directional vanes 409 are flat, approximately 3 inches wide, extend the entire length of opening 408, and serve to direct cooling airflow from manifold 405 onto and through upper fixed falling curtain of feed particles 407.

Feed particles from a source not shown enter drum 401 to form cascading bed 410. As drum 401 rotates, feed particles from cascading bed 410 are elevated by lifting flights 402 which continually discharge said particles to form multiple moving falling curtains 411 which continually travel horizontally and in wave-like fashion toward the center of drum 401. Feed particles discharging from lifting flights 402 fall upon upper deflector pan 402 and flow from said pan to form upper fixed curtain 407. Feed particles flowing from upper fixed curtain 407 and moving curtains 411 fall on and flow from lower deflector pan 404 to form lower fixed falling curtain 412. Essentially anhydrous molten urea from a source not shown is sprayed with great precision onto and along the entire length of lower falling curtain of feed particles 412 by means of urea spray header 413 to produce closely sized granular urea of high strength and quality.

DESCRIPTION OF THE PREFERRED EMBODIMENTS

Many of those practicing in the fertilizer industry have found, as I have found, that surplus, economically priced prilled urea which is presently available on the world market is of a relatively small particle size, has low crushing strength, oftentimes contains quantities of small lumps or agglomerates (previously referred to as oversize) and fines or dust (previously referred to as undersize), and further, that such oversize and undersize is never present in consistent amounts. Pilot-plant tests have shown that when oversize and undersize particles were removed from the urea prills fed to the granulation drum, precise control of the granulation process including product size and quality was easily maintained; i.e., closely sized urea prills were fed into the granulation drum at the specified rate, onto which a specified rate of essentially anhydrous molten urea was sprayed, which produced a predetermined, closely sized granular urea product of high strength with other favorable properties.

It will become apparent to those skilled in this art who further read this disclosure that the process of the present invention and several embodiments of such process as for example, those illustrated in FIGS. 1 and 2 are very flexible. For example, by tailoring the feed rate and particle size of the urea-prill feed to the granulation drum for a specified molten urea rate and selecting the proper size product screen cloths, it is quite easy and convenient to produce products of several sizes to meet special applications and market requirments. It will also become apparent to those versed in this art that multigrade fertilizers such as X-X-X, X-X-O, and/or X-O-X can be produced by the process of the present invention by "overcoating" smaller particles of phosphatic, potassium, and/or blends of fertilizer particles such as diammonium phosphate (DAP), monoammonium phosphate (MAP), and muriate of potash (KCl) to produce multigrade fertilizers as is demonstrated in Example IV infra of this disclosure.

A typical application of the method illustrated in FIG. 2 supra would be that of properly retrofitting the process to an existing urea-production facility for the purpose of both producing a superior product and for increasing production. In the instance of a small facility having a urea-synthesis plant with a capacity of about 300 tons per day, a retrofitting, the facility could realize a maximum increase in production of about 65 percent without the added cost of increasing the capacity of the urea-synthesis plant. The increase in production would result from feeding purchased urea prills in the process. The total plant production would be dervied from 300 tons per day (dry basis) of urea solution from the existing urea-synthesis plant, 150 tons per day of persized urea prills fed to the rotary granulation drum, and about 45 tons per day oversize and undersize from the urea-prill sizing screen which would be recovered in the steam-heated dissolving tank, and as 75 to 77 percent solution, fed to the urea evaporator thereby increasing the essentially anhydrous molten urea feed rate to the granulation drum from 300 to 345 tons per day and increasing production from 300 to 495 tons per day.

In the method of the present invention, as illustrated in FIG. 1 supra, dust generated in the process was shown to be recovered in a dry collector, and as dust, makes up a portion of urea feed to the urea melter for processing into molten urea feed to the granulation drum. In some instances, those practicing this art may prefer to recover the generated dust in wet scrubbers utilizing the scrubber liquor produced in liquid fertilizer formulations or other applications. In other instances, those practicing the art of the embodiment illustrated in FIG. 2 may prefer to recover the generaed dust in dry collectors. The collected urea dust would then be recovered in the dissolving tank.

In pilot-plant tests, horizontally rotating screens were used for presizing of the urea-prill feed to the granulation drum and sizing the granules from the fluid-bed cooler. There are several screening systems available that would most probably perform these functions adequately.

It is without doubt that those who practice the art would prefer to perform some of the functions of this disclosure, for example, dust recovery, screening, and cooling of granulated particles by alternate means, all of which are within the scope and spirit of this disclosure—provided, of course, that such alternate means perform the functions of this disclosure within acceptable limits.

Those familiar with process and process equipment development procedures will realize, of course, that there are sometimes more than subtle differences in the design of pilot-plant and production-plant equipment. A case in point is the pilot-plant rotary granulation drum as illustrated in FIG. 3 which was designed with maximum flexibility in mind while a granulation drum for a production plant would not necessarily require such flexibility as for example, the multipurpose assembly which consists of the upper deflector pan, cooling-air distribution manifold, and lower deflector pan and located in the upper section of the granulation drum. The cooling-air distribution manifold was attached to the upper and lower deflector pan with hinges spaced along the length of the manifold. The hinges allowed flexiblity; i.e., the angle of the deflector pans could be adjusted during operation and without alterations. The dust shield was not attached to the cooling-air distribution manifold and was free to move up and down when adjustments to the angle of the upper deflector pan were made. The cooling-air distribution manifold could readily be detached and removed from the drum if necessary by disconnecting the inlet air duct and driving out the hinge pins.

In larger granulation drums, it may be found desirable to construct the multipurpose assembly as a unit to achieve greater structural strength. It may also be desirable that the cooling-air distribution manifold be constructed so that its cross-section is of other configurations such as that of a parallelogram. Additional deflector pans and cooling-air distribution manifolds may be installed in very large granulation drums, all of such variations should be considered to be within the scope and spirit of this disclosure.

Blouin in U.S. Pat. Nos. 3,991,225 and 3,877,415 supra has taught art of utilizing lifting flights and a deflector pan to form a homogeneous distribution of particles into a falling curtain in a granulation vessel onto which essentially anhydrous molten urea is sprayed thus improving granulation. Shirley in U.S. Pat. No. 4,213,924 supra and Shirley et al in U.S. Pat. No. 4,506,453 and 4,424,176 supra have further developed the art of urea granulation and heat transfer by both the rapid evaporation of water inside the granulation drum to cool the ventilation air flowing through the drum and by the use of the multiplicity of propeller-type fans to blow the air cooled by water evaporation onto the upper falling curtain of feed particles. It will be appreciated that the techniques of using propeller-type fans and water evaporation was not employed in the present invention. Although sound in theory, the propeller-type fans and water evaporation technology, as applied to urea granulation, proved difficult to maintain and operate in production-size granulation drums and, as a result, these features were not well accepted by the industry. The most serious problems encountered with the use of fans and water evaporation technology were that water often leaked from its piping and nozzles inside the drum and caused buildups on the drum shell; dust buildup on the blades of the propeller caused them to become unbalanced and break down; and perhaps most seriously, air blown by the fans did not effectively penetrate the dense falling curtain of feed particles to cool the free-falling particles behind the curtain. Instead, air from the fans, after striking the dense curtain, bypassed the curtain by flowing in the reverse direction underneath the upper deflector pans and fans toward the center of the drum and laterally along the curtain into the exhaust hood.

It can be seen from the cross-sectional view of FIG. 3 that the multipurpose assembly was designed and constructed so that the airflow from the cooling-air distribution manifold cannot bypass the falling curtain of feed particles. Since the manifold is attached and sealed to the top and bottom deflector pans and baffled at each end of the manifold (not shown), cooling air was positively forced through the curtain to provide cooling for the falling curtain of particles and the free-falling particles behind the curtain.

The present invention allows for the practice of several variations thereof, for example, airflow through the drum could either be made cocurrent as shown in FIG. 3 or countercurrent to the flow of granules through the drum with equal utility. Also, cooling air entering the feed end of the drum, as shown in FIG. 3, could enter from the discharge without loss of utility. Under almost all ambient conditions, refrigeration of cooling air would not be needed; however, it is conceivable that should a granulating plant of this type be located where the climate is extremely hot and humid, refrigeration and dehumidification of the cooling air would be required. These features, all of which are considered to fall within the scope and spirit of this disclosure, allow the practitioner of the present invention considerable freedom of design and application.

EXAMPLES

In order that those skilled in the art may better understand how the present invention can be practiced, the following examples are presented by way of illustration only and not necessarily by way of limitation since numerous variations thereof will occur and will undoubtedly be made by those skilled in the art without substantially departing from the true and intended scope and spirit of the present invention herein taught and disclosed.

It can be seen that the term size guide number (SGN) is used frequently in the following examples. SGN, which has widespread use in the fertilizer industry, is a dimensionless number that represents an average or median particle-size diameter of an aggregate of particles exposed in millimeters (mm) times (x) 100 and then rounded to the nearest 5. Thus, feed urea prills, granular urea, or other similar particles having an average diameter of 2.18 mm would have an SGN of 220. The SGN can be determined by plotting the values of the cumulative particle-size analysis in the form of a graph and selecting the midpoint of the curve or the SGN can be determined mathematically by the following equation.

$$SGN = \left[ x + \left( \frac{50 - LS}{HS - LS} \right)(y - x) \right] 100$$

where:

x = screen opening size in mm for the screen immediately above 50 percent as determinedd by cumulative particle-size analysis.

y = screen opening size in mm for the screen immediately below 50 percent of cumulative particle-size analysis.

HS = cumulative percent of particles retained on screen y.

LS = cumulative percent of particles retained on screen x.

For convenience to the reader, the tabulated data which reflects the operations of and results from the following examples, are presented together in Table I at the end of Example IV.

EXAMPLE I

Pilot-plant test 122 was one of a series of 19 tests totaling about 96 hours of operation made for the purpose of more clearly defining the parameters affecting the practice of the present invention. The specific purpose of pilot-plant test 122 was to produce a larger-than-standard-size granular urea product of high strength for direct application to such crops as wheat and rice where larger-than-standard-size granular urea is preferred. In this test, a very satisfactory large granular urea product (crushing strength =7 pounds for −7+8 Tyler mesh-size granules) was made at the production rate of 2,940 pounds per hour by the process illustrated in FIG. 1. Large presized urea prills, predominantly −7+9 Tyler mesh (SGN=260) which had a normal crushing strength of about 3 pounds (−7+8 Tyler mesh size), were fed to the granulation drum at the rate of 1,020 pounds per hour. Recycled undersize from the product screens was returned to the drum at the rate of 540 pounds per hour. Onto the falling curtain of solid feed in the drum (1,560 pounds per hour total) was sprayed essentially anhydrous molten urea at the rate of 1,920 pounds per hour. Granulation at the melt/prill weight ratio of 1.9 (melt/solids weight ratio=1.2) was considered very good. The large granular urea product, produced in test 122, and predominantly −6+8 Tyler mesh (SGN=275), was very round and smooth (sphericity=85%) with high crushing strength and other favorable properties. The 1,020-pound-per-hour urea-prill feed represents an increase in production rate of about 53 percent. Operating data and product characteristics are listed in Table I infra.

EXAMPLE II

The purpose of pilot-plant test 145 was to produce a small-size granular urea product suitable for sulfur coating for production of a controlled release nitrogen fertilizer of the size preferred by the fertilizer industry for use in lawn and garden fertilizer formulations. In test 145, a very satisfactory granular urea product was made at a production rate of 3,300 pounds per hour by the process as illustrated in FIG. 1. Small presized urea prills, predominantly −10+20 Tyler mesh (SGN=130), were fed to the granulation drum at the rate of 900 pounds per hour along with recycled undersize particles from the product screen at the rate of 690 pounds per hour. Molten urea was sprayed onto the falling curtain of feed particles in the drum at the rate of 2,400 pounds per hour producing a melt/prill weight ratio of 2.7 (melt/solids weight ratio=1.5). The product from test 145 was about 98 percent −8+12 Tyler mesh (SGN=180). It was very round and smooth (sphericity=94%) and had a crushing strength of 4 pounds for the −8+9 Tyler mesh-size granules. The product was proven to be an excellent substrate for sulfur coating. Operating data and product characteristics for test 145 are given in Table I infra. The urea-prill feed rate of 900 pounds per hour represents an increased production rate of about 37.5 percent.

EXAMPLE III

The purpose of pilot-plant tests 184–5, which were duplicate tests, was to produce a standard-size granular urea product at the production rate of 3,000 pounds per hour of the size that is preferred by the fertilizer industry for incorporating with other fertilizer components for production of bulk-blend fertilizer grades. Tests 184–5 were made using the process illustrated in FIG. 1 with the exception that wet scrubbers were used instead of a dry collector to recover urea dust generated during the tests. Low-quality, purchased urea feed prills were prescreened using screen cloths of 6 mesh and 12 mesh installed in the urea-prill feed screen to remove agglomerates, lumps, and dust. The sized urea prills were predominantly −8+12 Tyler mesh (SGN=190) and were fed to the granulation drum at the rate of 1,020 pounds per hour while recycled undersize particles from the product screen were returned to the drum at the rate of 1,860 pounds per hour. Urea melt was sprayed onto the falling curtain of solid feed particles at the rate of 1,980 pounds per hour or at the melt/prill weight ratio of 1.9 (melt/solids weight ratio=0.7). Very good granular urea product was produced in tests 184–5 which was about 97 percent −7+9 Tyler mesh (SGN=235). The product was very round and smooth (sphericity=85%) and had an average crushing strength of 7 pounds (−7+8 Tyler mesh size) with other favorble properties. Operating data and product characteristics are given in Table I infra. The urea prills fed to the granulation drum at the rate of 1,020 pounds per hour represent an increase in production rate of 51.5 percent.

EXAMPLE IV

The flexibility of the process of the present invention was well demonstrated in pilot-plant test UK-4. In this test, a satisfactory product of 31-0-21 grade (31% N-0% $P_2O_5$-21% $K_2O$) was made at the production rate of 3,000 pounds per hour by "overcoating" small particles of muriate of potash (63% $K_2O$) with molten urea (46.5% N). The method used in test UK-4 was the process illustrated in FIG. 1 of this disclosure with the exception that a wet scrubber system, instead of a dry collector, was used to recover process dust. Small, round potash particles, predominantly −8+14 Tyler mesh size (SGN=190), were fed to the granulation drum at the rate of 1,000 pounds per hour with recycled undersize particles from the product screen returned to the drum at the rate of 660 pounds per hour. Urea melt was sprayed on the falling curtain of solid feed particles in the drum at the rate of 2,000 pounds per hour (melt/potash weight ratio=2.0; melt/solids weight ratio=1.2). The granular 31-0-21 grade product produced in test UK-4 (100 percent −6+12 Tyler mesh size; SGN=220) was very round (sphericity=86%) and had a crushing strength of 4 pounds (−7+8 Tyler mesh size), which is considered adequate hardness though somewhat less than desired. Pilot-plant operating data and product characteristics of test UK-4 are presented in Table I below.

TABLE I

Urea-Granulation Pilot-Plant Operation Data and Product Characteristics

| Test No. | 122 | 145 | 184–5 | UK-4 |
|---|---|---|---|---|
| Test duration, h | 6.0 | 6.4 | 8.7 | 3.2 |
| Production rate, lb/h | 2,940 | 3,300 | 3,000 | 3,000 |
| Urea melter | | | | |
| Urea-prill feed rate, lb/h | 1,920 | 2,400 | 1,980 | 2,000 |
| Chemical analysis, wt % | | | | |
| Total N | 46.5 | 46.5 | 46.3 | 46.5 |
| Biuret | 0.3 | 1.2 | 0.7 | 0.6 |

TABLE I-continued
Urea-Granulation Pilot-Plant Operation Data and Product Characteristics

| | | | | |
|---|---|---|---|---|
| Conditioner | Nil | 0.3[a] | 0.2[a] | Nil |
| Moisture | 0.1 | 0.1 | 0.3 | 0.2 |
| Melt concentration, wt % | 99.9 | 99.9 | 99.7 | 99.8 |
| Conditioner added to melt, wt % | 0.23[b] | — | 0.6[c] | — |
| Granulation drum | | | | |
| Feed rate, lb/h | | | | |
| Urea melt | 1,920 | 2,400 | 1,980 | 2,000 |
| Presized urea prills | 1,020 | 900 | 1,020 | — |
| Size range, Tyler mesh | −7 +9 | −10 +20 | −8 +12 | — |
| Size guide number | 260 | 130 | 190 | — |
| Melt/prill wt ratio | 1.9 | 2.7 | 1.9 | — |
| Presized potash particles | — | — | — | 1,000 |
| $K_2O$, wt % | — | — | — | 63 |
| Size range, Tyler mesh | — | — | — | −8 +14 |
| Size guide number | — | — | — | 190 |
| Recycled undersize | 540 | 690 | 1,860 | 660 |
| Melt/solids wt ratio | 1.2 | 1.5 | 0.7 | 1.2 |
| Cooling air, acfm | 2,100 | 3,040 | 3,585 | 2,810 |
| Melt spraying pressure, lb/in² | 200 | 250 | 45 | N/A |
| Rotation, r/min | 6.5 | 5 | 6 | 11 |
| Melt spray nozzles, No. | 14 | 17 | 7 | 11 |
| Process temperatures, °F. | | | | |
| Granulation drum | | | | |
| Urea melt sprayed | 296 | 303 | 298 | 318 |
| Presized urea-prill feed | 75 | 80 | 80 | — |
| Presized potash feed | — | — | — | 73 |
| Recycled undersize feed | 88 | 109 | 90 | 73 |
| Cooling air entering | 72 | 74 | 80 | 68 |
| Granules exiting | 214 | 216 | 208 | 173 |
| Process cooler | | | | |
| Granules entering | 214 | 216 | 208 | 173 |
| Granules exiting | 102 | 110 | 119 | 125 |
| Product cooler | | | | |
| Product entering | —[d] | —[d] | 119 | —[d] |
| Product exiting | —[d] | —[d] | 92 | —[d] |
| Product characteristics | | | | |
| Chemical analysis, wt % | | | | |
| Total N | 46.5 | 46.5 | 46.1 | 31.1 |
| $K_2O$ | — | — | 20.6 | |
| Biuret | 0.9 | 1.79 | 1.3 | 1.6 |
| Moisture | 0.1 | 0.1 | 0.2 | N/A |
| Conditioner | 0.2[b] | 0.3[a] | 0.8[e] | Nil |
| Physical properties[f] | | | | |
| Bulk density, lb/ft³ | 47 | 48 | 48.5 | 54 |
| Angle of repose, degrees | — | — | 24 | 24 |
| Sphericity, wt % | 85 | 94 | 85 | 86 |
| Hardness, −7 +8 Tyler mesh, lb | 7 | 4[g] | 7 | 4 |
| Size range, Tyler mesh | −6 +8 | −8 +12 | −7 +9 | −6 +12 |
| Size guide number | 275 | 180 | 235 | 220 |

[a]Equivalent formaldehyde content in feed urea prills as purchased.
[b]Equivalent formaldehyde content added to the urea melt as conditioning agent.
[c]Equivalent content of calcium lignosulfonate added to the urea melt as conditioning agent.
[d]Product was not further cooled.
[e]Product contained 0.2% formaldehyde conditioner from feed prills and 0.6% calcium lignosulfonate conditioner added during test.
[f]Physical properties determined by procedures as outlined in TVA Bulletin Y-147.
[g]Value shown represents the crushing strength of −8 +9 Tyler mesh-size granules instead of −7 +8 mesh size.

INVENTION PARAMETERS

After sifting and winnowing through the data supra as well as other results and operations of my new, novel, and improved technique and apparatus, including method and means for the effecting thereof, the operating variables, including the acceptable and preferred conditions for carrying out my invention, are summarized below.

TABLE II
Invention Parameters

| Variables | Limits | Preferred | Most Preferred |
|---|---|---|---|
| Feedstock | | | |
| Urea melt | | | |
| Concentration, wt % | 95–100 | 99–100 | >99 |
| Temperature, °F. | 275–315 | 278–305 | 286 |
| Urea prills | | | |
| Size guide number[a] | 85–200 | 150–190 | 180 |
| Size guide number[b] | 85–300 | 225–275 | 260 |
| Size guide number[c] | 85–150 | 100–135 | 125 |
| Granulation Drum | | | |
| Melt/prill wt ratio | 1:1–40:1 | 2:1–3.5:1 | 2.5:1 |
| Melt/solids wt ratio | 0.5:1–7:1 | 0.7:1–1.5:1 | 0.9:1–1.2:1 |
| Rotation, % of critical speed | 15–40 | 17–25 | 20 |
| Air velocity through drum, ft/min | 25–200 | 50–150 | 100 |
| Process temperatures, °F. | | | |
| Urea melt to drum | 275–315 | 278–305 | 286–290 |
| Presized urea prills to drum | 25–160 | 45–100 | 60 |
| Recycled undersize to drum | 50–160 | 75–140 | 115 |
| Cooling air to drum | 0–110 | 50–95 | 60–75 |
| Granules exiting drum | 170–230 | 190–225 | 210–225 |
| Exhaust air from drum | 100–190 | 120–150 | 130–140 |
| Granules exiting process cooler | 100–155 | 110–140 | 115–125 |
| Product to storage | 60–110 | 85–105 | 90–100 |
| Product properties (urea) | | | |
| Chemical analysis, wt % | | | |
| Total N | 45.5–46.5 | 46.0–46.4 | 46.3 |
| Biuret | 0.2–3.0 | 0.2–1.5 | 0.2–0.7 |
| Moisture | <0.1–0.3 | <0.1–0.2 | <0.1–0.1 |
| Conditioner | 0–2 | 0.2–1.0 | 0.2–0.5 |
| Physical properties | | | |
| Crushing strength, lb (−7 +8 Tyler mesh) | 4–8 | 6–8 | 7–8 |
| Size range | | | |
| Size guide number[a] | 200–240 | 215–235 | 215–225 |
| Size guide number[b] | 235–600 | 250–395 | 275–300 |
| Size guide number[c] | 100–200 | 160–190 | 170–180 |

[a]For production of standard-size granular urea products.
[b]For production of larger-than-standard-size granular urea products.
[c]For production of smaller-than-standard-size granular urea products.

While I have shown and described particular embodiments of my invention, modifications and variations will occur to those skilled in the art. I wish it to be understood, therefore, that the appended claims are intended to cover such modifications and variations which are within the true scope and spirit of my invention.

What I claim as new and desire to secure by Letters Patent of the United States is:

1. In an improved process for granulation of materials wherein same is effected in an enclosed vessel by spraying particles of molten material onto rapidly moving granules of substrate such that said granules of substrate are increased in size by accretion as the sprayed particles solidify quickly on the surface of said substrate, said enclosed vessel comprising a rotating generally cylindrical drum equipped with lifting flights, the angle of the axis of which ranges upwards to about 3 degrees from the horizontal and said drum being equipped with deflector means, said deflector means comprising a plurality of deflector pans, said pans generally vertically displaced from one another wherein at least the top surface of each pan is substantially parallel with the axis of said drum; extends substantially throughout the length of said drum; is sloped downward at an angle of at least about 25 degrees with the horizontal in the direction toward the portion of the shell of said rotating drum moving in an upward direction and wherein at least said pan at the highest elevation therein is located horizontally above the axis of said drum and that portion, of each of said pans, juxtaposed its uppermost edge, with the exception of said pan at the highest elevation therein, subtends the lower edge of each succeeding pan thereabove, which improved process comprises:

(a) alternately causing at least a portion of said granules of substrate in said enclosed vessel to be generally vertically displaced upwardly, by means of said lifting flight, from a bed of rolling discrete particles generally maintained in the lowermost section of said drum and thereafter transferred in a succession of first cascades onto the top surface of at least said pan at the highest elevation in said drum and over substantially the full top surface thereof to effect movement thereover downwardly to the lower edge thereof wherefrom said particles free fall to the top surface of the next pan vertically disposed therebeneath and move thereover downwardly to the lower edge thereof and wherein the cycle of discharge of particles from the lower edge of a pan in free-fall mode to the top surface of the next pan vertically disposed therebeneath is repeated until said particles discharge from the lower edge of the lowermost pan comprising said deflector means and eventually free fall back to said bed, the successive free-fall modes of said particles from the lowermost edge of said pans comprising an interrupted curtain, or a succession of second cascades of particles, said second cascades, having a particle density substantially greater than the particle density of said first cascades formed by discharge of said particles from said lifting flights, with the angle of the fall line of said granules of substrate in the free fall portion of the descending attitude of said vertical displacement for eventual return to said bed ranging from about 90 degrees to the horizontal to about 5 degrees greater than the angle of repose of said granules of substrate;

(b) causing at least a portion of the air in said enclosed vessel to be utilized as cooling air and moved in a generally horizontal attitude in a manner so as to intersect said granules of substrate in a free-fall mode of their descending attitude of said vertical displacement, said generally horizontal movement of air being sufficient to at least partially penetrate at least one of said cascades of said free falling granules of substrate, with the contact angle between said air and the plane of the fall line of said at least one cascade ranging from between about −45 degrees to about +45 degrees from the direction perpendicular to the plane of said fall line; and (c) causing at least a portion of said air in said enclosed vessel having intersected and at least partially penetrated said at least one cascade of said granules of said substrate therein to be displaced to exhaust means;

the improvement in combination therewith for effecting substantially improved heat transfer between the granulated material in said enclosed vessel and the air introduced therein which comprises the additional steps of:

(1) confining the portion of said cooling air to be moved in step (b) supra within first manifold means and moving same therein generally parallel to the axis of said drum to effect introduction of same into said drum;

(2) subsequently effecting a change in the direction of said cooling air movement, from the perspective of the planer view thereof, in the range of from about 45 degrees to about 135 degrees from the direction of said cooling air movement in step (1) supra;

(3) subsequently causing said cooling air to move through a plurality of apertures, the total area of said apertures ranging from about 8 to about 15 times the cross-sectional area of said first manifold means with the points of origin of said cooling air exiting said apertures extending substantially throughout the length of said drum and generally defining a plane substantially parallel to the axis of said drum and angularly disposed between about −45 degrees to about +45 degrees from a vertical plane, said vertical plane substantially parallel to the axis of said drum;

(4) substantially confining said cooling air exiting said plurality of apertures within second manifold means, said second manifold means having, as one generally planner boundary thereof, said at least one second cascade, the confinement of said air by said second manifold means substantially;

(i) eliminating lateral short circuiting or by-passing of said at least one second cascade by said cooling air; and (ii) intersecting said granules of substrate in a free-fall mode of their descending attitude of vertical displacement in a manner to thereby effect total penetration of said at least one second cascade with said confined cooling air; and (5) removing said air to said exhaust means; said improved process for granulation characterized by the fact that the substantial elimination of lateral by-passing of particles comprising said at least one second cascade by said cooling air substantially increases the penetration thereof and enhances the cooling efficiency of said process to a degree such that adjustments to the enthalpy of the cooling air, subsequent to its penetration of said at least one second cascade for recycling of same for purposes of subsequent contact with particles subsequently comprising said at least one second cascade, is substantially eliminated.

2. The improved process of claim 1 wherein the generally horizontal direction of the cooling air exiting said apertures is deflected upwards to about 45 degrees, prior to its contact with said particles comprising said at least one second cascade.

3. The improved process of claim 1 wherein the material granulated in said drum comprises urea, wherein from about 1/5 to about 1/3, on a weight percent basis, of the feed material to said drum comprises relatively small-sized urea prills characterized by low crushing strength and high friability, and wherein the resulting granulated product has a crushing strength (−7+8 Tyler mesh) ranging from about 6 to about 8 pounds.

4. The improved process of claim 2 wherein the material granulated in said drum comprises urea, wherein from about 1/5 to about 1/3 on a weight percent basis of the feed material to said drum comprises relatively small-sized urea prills characterized by low crushing strength and high friability, and wherein the resulting granulated product has a crushing strength (−7+8 Tyler mesh) ranging from about 6 to about 8 pounds.

5. In a granulating device including a rotary cylindrical drum having open ends and a length at least equal to its diameter, said drum disposed with its axis generally in about a horizontal attitude; a plurality of generally equally spaced lifting flights located on the inner peripheral surface of said drum and extending generally inwardly toward the axis thereof, two retaining rings singly disposed at the ends of said drum; liquid distributing means generally located in that lower quadrant, when viwed in a plane perpendicular to the axis of said drum, into which a point located at the bottommost position on said inner peripheral surface of said drum would next enter; said distributing means being substantially equal to the length of said drum between said retaining rings and generally disposed within said drum parallel to the axis thereof, means for passing a current of air through said drum; deflector means rigidly supported by support means located outside the confines of said drum; said deflector means positioned within the confines of said drum and being of a length substantially equal to the length of said drum between said retaining rings and in a plane substantially parallel with the axis of said drum; the uppermost portion of said deflector means, along the width thereof, being generally horizontally inclined upwardly from that first upper quadrant 90 degrees removed from said lower quadrant and into that second upper quadrant which is 180 degrees removed from said lower quadrant, the width of said deflector means being predetermined to allow for rotation of said drum and lifting flights thereover, said deflector means having a discharge aperture along the lower edge thereof generally parallel to the axis of said drum, said deflector means comprising a plurality of deflector pans, said pans generally vertically displaced from one another wherein at least the top surface of each pan is substantially parallel with the axle of said drum; extends substantially throughout the length of said drum; is sloped downward at an angle of at least about 25 degrees with the horizontal in the direction toward the portion of the shell of said rotating drum moving in an upward direction and wherein at least said pan at the highest elevation therein is located horizontally above the axis of said drum and that portion, of each of said pans, juxtaposed its uppermost edge, with the exception of said pan at the highest elevation therein, subtends the lower edge of each succeeding pan thereabove, the improvement in combination therewith which comprises:

(a) first manifold means in parallel alignment with the axis of said drum and disposed through an open end thereof and having a plurality of apertures on one side thereof, said apertures generally defining a plane parallel to the axis of said drum and angularly disposed upwards to about 45 degrees from a vertical plane parallel with and intersecting said axis, the length of said plane defined by said apertures being disposed within the confines of said drum and substantially equal to the inner dimensional length of said drum and the total area of said apertures ranging from about 8 to about 15 times the cross-sectional area of said first manifold means;

(b) said first manifold means being juxtaposed at least two said generally vertically displaced and adjacent pans and being in sealed relationship therewith; and (c) second manifold means juxtaposed said first manifold means and disposed between said at least two generally vertically displaced and adjacent pans to which said first manifold means is in sealed relationship, said second manifold means being in sealed relationship with said first manifold means and said at least two generally vertically displaced and adjacent pans and having as the first boundary thereof a cascade a particles free falling through the area defined by said first boundary, said first boundary defined at the upper edge thereof by the lower edge of the higher elevated pan and at the bottom edge thereof by that portion near the lower edge of the lowest most elevated pan which subtends said higher elevated pan of said at least two generally vertically displaced and adjacent pans.

6. The improved device of claim 5 wherein said generally vertically displaced and adjacent pans comprises two pans.

* * * * *